March 29, 1927. Re. 16,577
E. V. CROWELL
GAS EMERGENCY CONTROL FOR FLOWING OIL OR GAS WELLS
Original Filed June 11. 1921 3 Sheets-Sheet 1
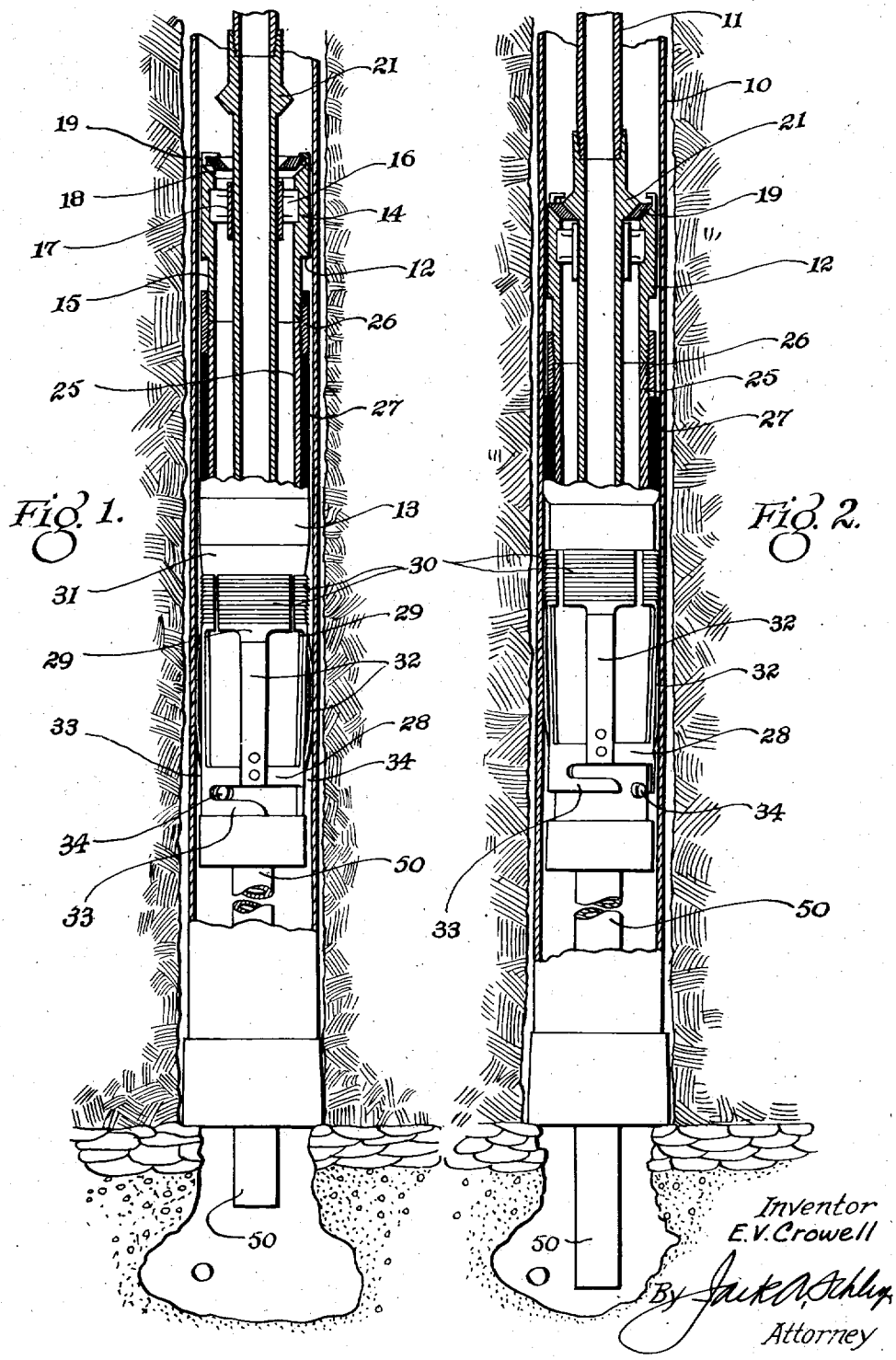

March 29, 1927. Re. 16,577

E. V. CROWELL

GAS EMERGENCY CONTROL FOR FLOWING OIL OR GAS WELLS

Original Filed June 11, 1921 3 Sheets-Sheet 2

Inventor
E. V. Crowell

By Jack A. Ashley
Attorney

March 29, 1927. E. V. CROWELL Re. 16,577
GAS EMERGENCY CONTROL FOR FLOWING OIL OR GAS WELLS
Original Filed June 11, 1921 3 Sheets-Sheet 3
Fig. 7.
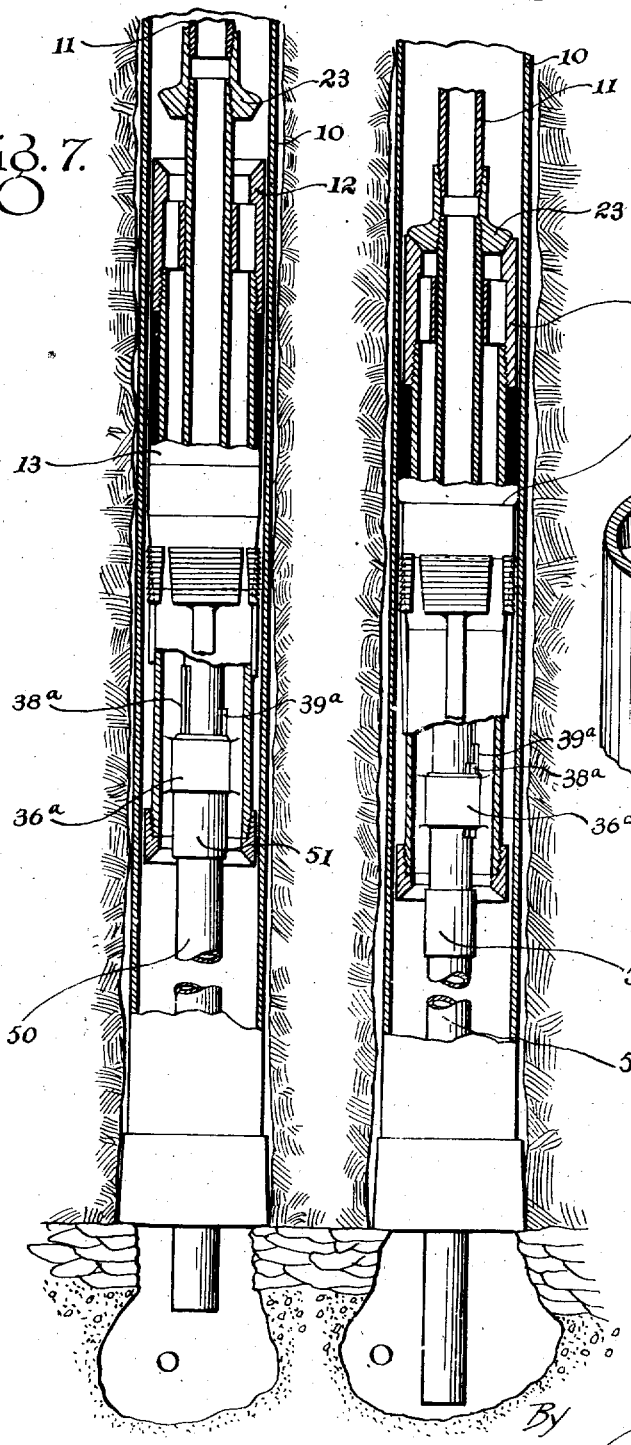
Fig. 8.
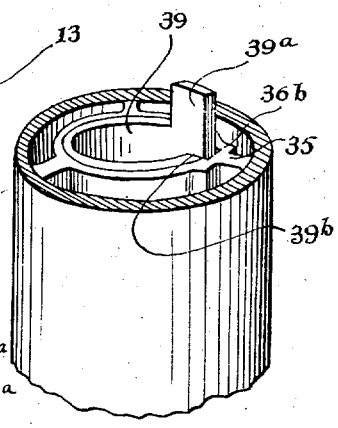
Fig. 9.
Inventor
E. V. Crowell
By Jack A. Ahlen
Attorney Reissued Mar. 29, 1927. Re. 16,577

UNITED STATES PATENT OFFICE.

ERD V. CROWELL, OF LOS ANGELES, CALIFORNIA, ASSIGNOR TO THE GUIBERSON CORPORATION, OF DALLAS, TEXAS, A CORPORATION OF DELAWARE.

GAS-EMERGENCY CONTROL FOR FLOWING OIL OR GAS WELLS.

Original No. 1,432,674, dated October 17, 1922, Serial No. 476,714, filed June 11, 1921. Application for reissue filed October 31, 1924. Serial No. 747,125.

The present invention relates to an improved gas energy control for flowing oil or gas wells adapted to utilize in a most efficient manner the gas contained in or present with the oil.

Crude oil is a mixture of bituminous hydrocarbons; liquids, solids and gases,—the solids and gases being soluble in the liquids. The liquefication of the combined elements, and degree of solubility are determined by pressure.

Both natural gas and oil are generally found in the same sand, both are of a common origin, the gas being merely a volatile component of the oil, dissolved in the oil under and by means of pressure. The gas, when found associated with the oil, under pressure, imparts a motive energy to the oil, which motive energy tends to make the oil accessible to recovery, by prompting its movement through the sand toward the well. Thus since oil is energized by the dissolved gas, through a process of compression, and since the recovery of the oil is dependent on the motive energy imparted by the dissolved gas, it is evident that efficient oil recovery is dependent on a restricted and regulated release of the pressure during the process of production.

It has long been an observable fact that much more gas accompanies the production of a barrel of oil than could be held in solution under the original well pressure, indicating that the expulsive energy originally contained in several barrels of oil is required to expel one barrel from the sand.

There is a definite and limited amount of "gas energy" in the oil of each district, and efficient oil recovery is measured by the efficient use of this gas energy.

Crude oil, in its native state is very elastic, conformably filling the pore-spaces in the sand body with a uniform pressure. The gas energy, if released unrestricted, will have a marked tendency to slip by the oil through the larger pores of the sand, and through the parts of the sand offering least resistance without expending much energy in actually moving oil.

The "efficiency of expulsion" of the "gas energy" decreases enormously with each degree of saturation; so that greatest actual as well as relative recovery would be recoverable while the sands are fully and uniformly saturated, even if more gas energy could be stored in the sand when less completely filled with oil. Thus the necessity of placing a flowing oil well under immediate control as soon as drilled in.

Therefore, if by a more efficient control of the gas energy we lessen the volume or proportion of gas with each barrel of oil produced, we should increase the total recovery from the oil sand correspondingly, and consequently control the source of supply, to a great extent.

Important objects of the invention are to provide a device of this character, which may be installed when the gas pressure is heavy, as the valves open up to full capacity, relieving the pressure and allowing the device to be lowered into the well against a heavy pressure; to provide means for aiding and compelling the oil movement in the sand in one direction only, which direction is toward the well; to provide means for properly utilizing the gas energy associated with the oil by a more even distribution of the use of the gas energy with respect to the volume of oil raised; to provide means for effecting a more even flow of oil, by the gas energy, eliminating the agitation of the oil to a great extent; to provide means for causing the gas energy to exert a more efficient and continuous lifting force upon the oil; to provide means to prevent the gas energy, to some extent, when the pressure is weak, and totally if the pressure is heavy, from exerting more than one expulsive force to the oil; to provide a device of the above mentioned character which is elastic in its adjustment and consequent regulation in the flow of oil, so that the flow may be gaged according to the constantly declining gas pressure; to provide a device of the above-mentioned character which is simple in construction, easy to install and may be removed from the well for use any number of times; to provide means for efficiently utilizing the gas energy associated with the oil, in the sand, for prompting a more complete depletion of the oil sand, by maintaining the oil energized and susceptible of recovery; to provide means for preventing collapse of the casing during the gushing period of the well; and to provide means for a more even prorating of the gaseous hydrocarbons to the oil produced, by means of a regulated and restricted release of the gas pressure, in the oil sand, during the process of production.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a view, partly in vertical section and partly in elevation of the device, showing the position occupied by the parts when the device is being inserted in the well or is being adjusted therein;

Figure 2 is a similar view, showing the position occupied by the device when the device is anchored in position in the well;

Figure 7 is a view, partly in vertical section and partly in elevation of another embodiment of the invention, showing the position occupied by the parts when the device is being inserted in the well or is being adjusted therein;

Figure 8 is a similar view, showing the position occupied by the device when it is anchored in position in the well, and Figure 9 is a detail view in fragmentary perspective of the lower spider and its gudgeon.

Figure 3:
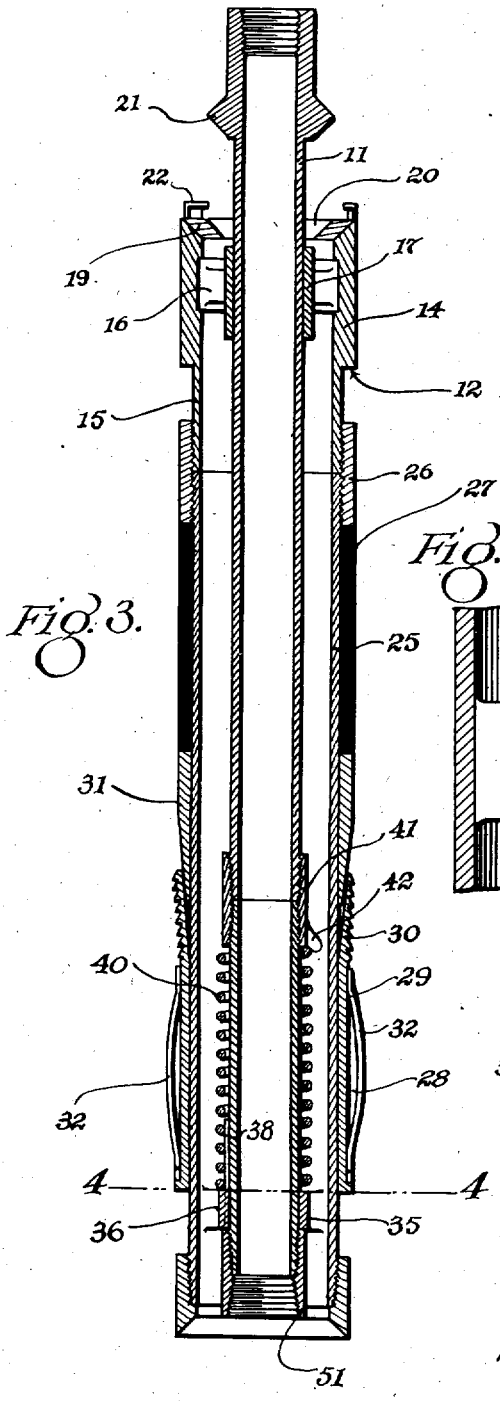
Figure 3 is an enlarged view in vertical section of the device.

Referring to the drawings wherein for the sake of illustration is shown the preferred embodiments of the invention, it will be seen that in all embodiments of the invention the well casing is designated at 10, and tubing 11 constituting a flow pipe or discharge tubing extends downwardly in the well casing. A control head, designated generally at 12, is arranged within the well casing on the flow pipe 11 and is organized with a packer indicated generally at 13, which is preferably of the hook-wall type.

The control head comprises an open-ended body portion 14 having a depending cylindrical extension 15. Within the cylindrical body portion a spider 16 is provided and includes a hub 17 having a smooth bore which slidably receives the tubing 11. The upper end of the body portion of the control head is ground or otherwise machined to form a valve seat 18.

In the embodiment of the invention shown in Figures 1, 2 and 3, a pressure operated ring valve 19 has its outer peripheral face adapted to coact with the valve seat 18 and form a gas-tight joint therewith in the closed position of the valve and has its inner peripheral face machined or ground to provide a valve seat 20 with which a positively operated valve 21, preferably integrally formed with the tubing 11, is adapted to cooperate and with which the valve 21 forms a gas-tight joint in the closed position of the valves. Stops or limit lugs 22 are carried by the control head and limit the open movement of the ring valve 19. It is obvious that the positively operated valve 21 not only cooperates with the ring valve 19 to control the passage of the gas through the control head but it also serves to control the ring valve itself.

In the embodiment of the invention shown in Figures 7 and 8, the pressure operated valve is omitted and a single positively operated valve 23 is provided and cooperates with the valve seat of the control head.

In all embodiments, the packer 13 is, preferably, of the hook-wall type and comprises an elongated cylindrical structure or body portion 25 which is connected to the extension 15 of the control head. A rubber 27 or similar packing element is received on the body portion of the packer and abuts at its upper end the shoulder 26. Anchoring or supporting means is arranged on the body portion 25 below the packing element and includes a slip cage 28 embracing the body portion and carrying slips 29 having serrated or toothed faces 30 adapted for gripping engagement with the well casing. The slips are carried by the cage so as to be free to swing outwardly under the action of a slip cone or conical sleeve 31. Slip springs 32 are mounted upon the slip cage and engage the slips and are adapted to frictionally engage the wall of the well casing. A hook 33 carried by the slip cage cooperates with a pin 34 carried by the body portion 25 to maintain the slips out of engagement with the wall of the well casing when the pin is received in the bight of the hook.

A lower spider 35 is carried by the body portion of the packer and includes a hub 36 having a key-way 37 extending longitudinally thereof.

In the embodiments of the invention shown in Figures 3 to 6, inclusive, an operating or orienting key 38 extends longitudinally of the tube 11 and is welded or otherwise secured thereto and is slidably received in the key-way 37 whereby the rotary movement of the tubing is transmitted to the body portion of the packer and the control head although the tubing may partake of limited relative rectilinear movement with respect thereto.

In the form of the invention shown in Figure 3, a coil spring 40 is arranged on the tubing 11 and abuts at one end a spider 36 and at its other end a suitable abutment which may be constituted by the coupling 41 and lips 42 provided thereon. The spring constitutes yieldable means for maintaining the valve 21 in open position and permitting the valve 19 to open while permitting the closing of these valves in a manner to be hereinafter more fully described.

Figure 6:
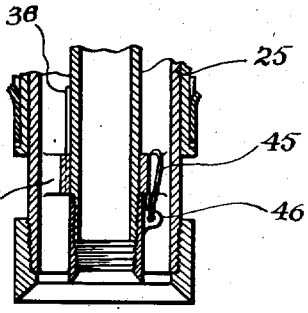
Figure 6 is a similar view of another modification.
Figure 5:
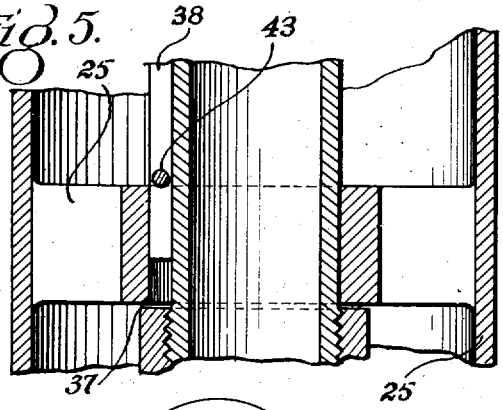
Figure 5 is a detail view in vertical section of a modification.
Figure 4:
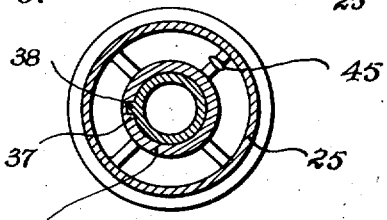
Figure 4 is a transverse horizontal sectional view on line 4—4 of Figure 3.

In lieu of the spring 40 other yieldable means may be employed such for instance as a lug 43 of lead or the like (see Figure 5) carried by the key 38 or by the tubing 11 if desired and engageable with the hub 36 and adapted to be sheared off to permit the closure of the valves. Another means which may be employed for carrying out this purpose is shown in Figure 6, and consists of a frangible wire 45 secured to an ear 46, carried by the tubing, and encircling one of the wings or arms of the spider. The wire is adapted to be broken to permit of the closure of the valves.

In the form of the invention shown in Figures 7, 8 and 9 the yieldable means is omitted and a gudgeon 39 is secured in the hub of the spider and has an upstanding abutment lug $39^a$ and is provided with a key-way alined and communicating with the key-way $36^b$ of the spider 35. The orienting or operating key, designated at $38^a$, is adapted to cooperate with either the top of the spider or with the keyway. The key $38^a$ is secured to the tubing 11 and when its lower end abuts the top of the hub of the spider it serves to maintain the valve 23 in open position as shown in Figure 7, and when the tubing 11 has been turned to dispose the key over and permit it to slide down into the keyways $39^b$ and $36^b$ of the hub and gudgeon respectively, the valve 23 moves downwardly to closed position as shown in Figure 8. It is to be noted that the abutment lug $39^a$ coats with the key to cause it to aline with the keyways when the tubing 11 is turned to permit closing of the valve 23. Again the key $38^a$ may engage the lug $39^a$ from the side opposite the keyways to turn the control head so as to cause the pin 34 to re-enter or re-engage the hook 33.

In all embodiments, the flow pipe or discharge tube 11 has attached thereto below the hook wall packer a string of tubing designated at 50 which is attached to the tubing 11 by means of a coupling 51 and the tubing 50 constitutes a swinging anchor or an intake for the oil. The coupling 51 also constitutes an abutment engageable with the underside of the spider 35 for limiting downward movement of the packer and control head on the discharge tubing, and in the embodiment shown in Figures 7 and 8 it limits the upward movement of the key $38^a$ to rotative engagement with the top of the hub of the spider 35.

In order that the purpose of the invention might be better understood and a particular and exclusive advantage of its application to a flowing oil well whereby to provide means for more definitely prorating the gas energy to the oil during the process of production might be better appreciated it is thought well to include here a brief survey of the physical forces to be controlled together with the measurements of these physical forces which the device is to regulate.

The "flow action" is the result of the release of the combined hydrocarbons from a heavy pressure, where most of the volatile gases are found compressed into liquid form, dissolved into the oil under pressure, but expand and become true gases immediately upon release of this pressure. When a porous sand body is punctured by the drill there is an immediate release of pressure and the consequent rush of oil and gas to the well.

Gas is much more mobile than oil and capable of more easy movement through the porous sand body due to its lack of capillarity and the consequent lack of frictional resistance. It is therefore the tendency for the gas to slip by the oil through the larger pores of the sand and escape through the well bore without expending much energy in actually moving oil.

The "flow energy" is measured by the volume and pressure of the gas, and the extent to which the oil is energized by the gas depends upon the relative proportion of oil to gas and the pressure under which they coexist.

It is very often the case to encounter a sand body without enough gas to energize any great percentage of the oil regardless of the pressure under which they may exist, and again it is common occurrence, especially in a shallow sand territory, to find the volume of gas present but the lack of pressure for prompting the oil to become energized by the gas.

Although gas is more mobile than oil, yet it is a fact, proven out in practice, that oil is capable of more aggressive movement through the sand than free gas, when both are laboring under the same conditions. This may be observed by closing a gushing oil well in at the top, right after an expulsion of oil, when the well bore is practically empty of oil; when the oil will move into the well bore and re-absorb the gas found there that had previously escaped from solution with the oil. The oil will continue to move into the well bore and rise to such level that the weight of the fluid column in the well bore will just about counter-balance the gas-pressure in the sand body, and the well is said to have reached its "head pressure," commonly referred to as "headed up."

It is an established fact that where the oil and gas are found associated in a tight close-grained sand body that the percentage of ultimate recovery is much greater than from a loose coarse-grained sand body, indicating that when the combined hydrocarbons are permitted to be restrictively released from pressure, that a greater percentage of oil is made to move through the sand to the well, as a result of keeping the gas associated with the oil while en route through the sand to the well. Thus by a proper regulation of the gas energy it is not only possible to increase the efficiency of expelling the oil through the well bore, but more effectually do artificially what nature does naturally, and actually control the source of supply to a great extent.

Obviously, the problem here is to provide means for mechanically controlling the gas energy so that the maximum volume of oil is mobilized at the well hole and subsequently expelled through the well bore with the liberation of the minimum volume of free gas. Thus not only effecting a more enonomical expenditure of the gas energy in lifting the oil from the well bore but actually maintaining a greater percentage of the oil energized and susceptible of movement through the sand to well bore and thereby greatly increase the percentage of ultimate recovery from the porous sand body.

This purpose may be accomplished by properly regulating the factors of "flow energy" which are volume and pressure of the gas by providing a gradually restricted reservoir in which the oil and gas may accumulate, together with a very restricted vent-pipe, as represented by the tubing 11, through which they flow.

For purpose of illustration consider Figure 1, where the well merges with the opening "O" in the stratum of oil sand, commonly known as the "shot hole." The volume of the well bore below the packer constitutes a reservoir wherein the gas mobilizes the oil preparatory to expelling the oil through the tubing 11, commonly referred to as the "compression chamber."

For every stated volume and pressure of gas there is a certain volume of "compression chamber," above or below which the gas will not expel the oil with full efficiency. In order to enjoy the full expulsive efficiency of the gas energy it is therefore necessary to provide means for gradually restricting the volume of the compression chamber as the gas energy declines with the flow life of the well.

If the compression chamber is too restricted, the gas will force the oil out with an explosive force, even by-passing the oil, and if the compression chamber is too large, the gas will channel up through the column of oil and escape off of the top, whereas if the compression chamber is properly regulated the oil will be expelled in a more quiet way without much dissipation of free gas.

By means of the device it is possible to successively lower the packer in the well bore and consequently gradually restrict the volume of the compression chamber as the volume and pressure of the gas declines, and thereby maintain a more even flow of oil through the tubing 11 with the minimum expenditure of gas energy.

In practice, the swinging anchor or tubing below the packer is positioned at a point approximately one-fourth of the way up from the bottom of the well and the packer is positioned about one-half way up from the bottom of the well thus providing a compression chamber O of about one-half the volume of the well hole.

Then if the well does not flow as prolifically as desired, or if there is a tendency for the rate of flow to decrease too much, additional tubing can be added and the gas energy control head thus gradually lowered, consequently restricting the compression chamber until a proper flow of oil is effected. The proper flow of oil may thus be obtained by gradually lowering the device as the gas energy declines with the age of the well. The maximum compression chamber may thus be provided, for each stage of gas energy decline, by regulating the vertical position of the gas energy control head in the well.

In introducing the device into a well against a heavy pressure when employing the embodiment of the invention shown in Figures 1 to 3, the valves 19 and 21 are maintained open by the action of the spring 40 or other yieldable means which may be provided and when employing the embodiment of the invention shown in Figures 7 to 9, the valve 23 is maintained open by the engagement of the key 38[a] with the top of the hub of the spider.

When the tubing, control head and packer are in the desired position the tubing is rotated or turned approximately 180 degrees thus turning or orienting the body portion of the packer on which the pins 34 are carried. In the form of the invention shown in Figures 6 to 9, the tubing 11 must be first turned to permit the key 38[a] to enter the key way and then turned to orient the body portion. This movement of the body portion 25 releases the pins from the hooks and releases the slip cage from its connection with the body portion of the packer. The slip springs which frictionally engage the wall of the well casing maintain the cage and the slips stationary in the well casing and as the lowering of the tubing control head and packer continue, the slip cone or conical sleeve 31 expands the slips 30, and forces their serrated or toothed faces into binding engagement with the well casing, thereby anchoring the whole device tubing and all.

Then as the weight of the tubing settles on this anchoring mechanism the valves 19 and 21 are forced shut as the yielding means gives way under this action. If the yielding means be the spring 40, it is compressed; if it be the lead lug 43 it is sheared off; and if it be the frangible wire 45 it is broken. With the form of the invention shown in Figures 6 to 9, the valve 23 is forced shut in a similar manner at this phase of the operation as the key 38ᵃ is then slidably arranged in the keyway and does not resist this action. Simultaneously with the shutting of the valve the rubber on the packer is expanded and seals the annular space between the packer and the casing, whereby the outlet for the oil and gas is consequently restricted to the tubing. By suitably handling the tubing the position of the packer and control head in the well may be varied and the compression chamber which is defined thereby may be varied.

Thus, I not only provide a device that may be lowered against a heavy gas pressure, whereby a flowing oil well may be tubed and "packed-in", regardless of the gas pressure, but I provide means for changing the vertical position of the device in the well, at the will of the operator. It is therefore possible to regulate the "flow energy", as represented by the "gas energy", so that the flow of oil from the oil sand, through the tubing, is more steady, and a minimum amount of gas escaping with each barrel of oil produced and the gas energy consequently works at its maximum efficiency in moving oil through the sand toward the well, and subsequently expelling the oil through the tubing, from the well.

In general the device provides a means whereby a string of tubing with packer attached may be lowererd into a flowing oil or gas well against a heavy gas pressure; a means whereby to close the valves of the device at any point in the well so that the flow may be restricted as desired; any amount of tubing may be suspended in the well provided with packing mechanism without the necessity of the tubing resting on the bottom of the well and this regardless of the gas pressure resisting the packing mechanism; and the vertical position of the energy control head may be changed so that the space below the packer may be regulated at the will of the operator for successively restricting the volume of the compression chamber as the gas volume and pressure declines.

It is obvious that the single positively operated valve of Figures 7 and 8 may be utilized in conjunction with the yieldable means of Figures 3 and 6 or that the cooperating valves of Figures 1 and 2 may be utilized in conjunction with rotatable key and gudgeon of Figures 7 and 9, within the purview of this invention as both the valves 19 and 21, and the valve 23 constitute valve means for controlling the flow of fluid through the control head and the yieldable means and rotatable key 38ᵃ constitute means for overcoming the resistance to the introduction of the device into a well, notwithstanding the fact that the key 38ᵃ also constitutes means for transmitting the rotary motion of the tubing 11 to the packer in another phase of the operation.

What I claim is:

1. In a device of the character described for use with oil and gas wells, discharge tubing, a packer having anchoring means for supporting the packer and discharge tubing at the desired point in the well and operated by rotary movement of the discharge tubing, a swinging anchor carried by the discharge tubing below the packer, a spider secured to said packer and slidably receiving the tubing, means for keying the tubing to the spider whereby it is constrained to rotary movement with the tubing while permitting relative longitudinal movement, a control head secured upon the packer, a spider carried by the control head and slidably receiving the tubing, co-acting valves carried by the control head and the tubing for controlling the flow of fluid through the packer and control head and a coil spring supported upon the spider of the packer and engaged with the tubing for yieldably maintaining said valves open.

2. In a device of the character described for use with oil and gas wells, discharge tubing, a packer having anchoring means for supporting the packer and discharge tubing at the desired point in the well operated by rotary movement of the discharge tubing, a spider secured to said packer and slidably receiving the tubing, means for keying the tubing to the spider whereby it is constrained to rotary movement with the tubing while permitting relative longitudinal movement, a control head secured upon the packer, a spider carried by the control head and slidably receiving the tubing, cooperating valves carried by the control head and the tubing for controlling the flow of fluid through the packer and control head and a coil spring supported upon the spider of the packer and engaged with the tubing for yieldingly maintaining said valves open.

3. In a device of the character described for use with oil and gas wells, discharge tubing, a packer having anchoring means for supporting the packer and discharge tubing at the desired point in the well operated by rotary movement of the discharge tubing, a spider secured to said packer and slidably receiving the tubing, means for keying the tubing to the spider whereby it is constrained to rotary movement with the tubing while permitting relative longitudinal movement, a control head secured upon the packer, cooperating valves carried by the control head and the tubing for controlling the flow of fluid through the packer and control head and a coil spring supported upon the spider of the packer and engaged with the tubing for yieldingly maintaining said valves open.

4. In a device of the character described for use with oil and gas wells, discharge tubing, a packer including a cylindrical body portion through which the discharge tubing extends, anchoring means carried by the body portion and adapted to be operated by rotary movement of the discharge tubing for controlling the flow of fluids, a spider carried by the body portion and having a longitudinal key-way therein, a key secured to the tubing and slidable in the key-way, a control head, cooperating valves carried by the control head and the discharge tubing for controlling the flow of fluid through the packer and control head, and a coil spring arranged upon the discharge tubing and supported at its lower end upon the spider of the packer and engaging the discharge tubing at its upper end for yieldingly maintaining said valves open.

5. In a device of the character described, in combination with a well casing, discharge tubing arranged in said well casing, a packer in said well casing through which said discharge tubing extends, said packer having anchoring means engageable with the well casing for supporting the packer and the discharge tubing, a control head arranged upon the packer and associated with the discharge tubing, cooperating valves carried upon the control head and the discharge tube for controlling the discharge of fluid through said control head, and a coil spring supported upon the packer and engageable with the discharge tubing for yieldably maintaining said valves open.

6. In a device of the character described, in combination with a well casing, discharge tubing arranged in said well casing, a packer in said well casing through which said discharge tubing extends, said packer having anchoring means engageable with the well casing for supporting the packer and the discharge tubing, a control head arranged upon the packer and associated with the discharge tubing, cooperating valve means carried upon the control head and the discharge tubing for controlling the discharge of fluid through said head, and yieldable means supported upon the packer and engaging the discharge tubing for maintaining said cooperating valve means open.

7. In a device of the character described, in combination with a well casing, discharge tubing therein, a packer arranged on the discharge tubing within the well casing and having anchoring means engageable with the well casing for supporting the packer and the discharge tubing, a swinging anchor carried by the discharge tubing below the packer, a control head arranged upon the packer, cooperating means carried by the control head and the discharge tubing for controlling the flow of fluid through said control head, and yieldable means supported upon the packer and engaging the discharge tubing for maintaining said cooperating means positioned to permit the discharge of fluid through said control head.

8. In a device of the character described for use with oil and gas wells, discharge tubing, a packer associated with the discharge tubing and having anchoring means for supporting the packer and the discharge tubing, said anchoring means being rendered active and inactive by rotation of the packer, means for transmitting the rotary motion of the discharge tubing to the packer, a control head arranged upon the packer, cooperating means carried by the control head and the discharge tubing for controlling the flow of fluid through said control head, and yieldable means supported upon the packer and engaging the discharge tubing for maintaining said valve means open.

9. In a device of the character described for use with oil and gas wells, discharge tubing, a packer associated with the discharge tubing and having anchoring means controlled by the discharge tubing, a control head arranged upon the packer, cooperating valve means carried by the control head and discharge tubing for controlling the flow of fluid through the control head, and yieldable means supported upon the packer and engaging the discharge tubing for positively maintaining said valve means open.

10. In a device of the character described for use with oil and gas wells, discharge tubing, a packer associated with the discharge tubing and having anchoring means controlled by the discharge tubing, a control head arranged upon the packer, cooperating valve means carried by the control head and discharge tubing, for controlling the flow of fluid through the control head and means for positively holding the valve means open while the device is being lowered into a well.

11. In a device of the character described for use with oil and gas wells, discharge tubing, a packer associated with the discharge tubing and having anchoring means controlled by the discharge tubing, a control head arranged upon the packer and having a valve seat thereon, a valve carried by the discharge tubing and engageable with said valve seat, and means for positively holding the valve open and away from the seat while the device is being lowered into a well.

12. In a device of the character described for use with oil and gas wells, discharge tubing, a packer associated with the discharge tubing and having anchoring means controlled by the discharge tubing, a control head connected with the packer and having a valve seat, a valve carried by the discharge tubing for engaging said seat, and positive means engaging with the discharge tubing for holding said valve elevated above said seat while said device is being lowered into the well.

13. In a device of the character described for use with oil and gas wells, discharge tubing, a packer associated with the discharge tubing, and having anchoring means controlled thereby, a control head secured upon the packer, valve means operated by the discharge tubing for controlling the flow of fluid through the control head, and positive means for holding the valve means open against an upward fluid pressure while said device is being lowered into the well.

14. In a device of the character described for use with oil and gas wells, discharge tubing, a packer associated with the discharge tubing, and having anchoring means, means under the control of the discharge tubing for transmitting the motion of the discharge tubing to the packer and its anchoring mechanism, whereby the anchoring mechanism is controlled by the discharge tubing, and may be set to support said tubing, a control head arranged upon the packer, valve means associated with said control head, and positive means for holding the valve means open against an upward fluid pressure while said device is being lowered into the well.

15. In a device of the character described for use with oil and gas wells, the combination of a discharge tubing, a body member through which the tubing is movable longitudinally, a packer carried upon the body, means for setting the packer in the well, a valve seat upon the body surrounding the tubing, a valve carried by the tubing and engaging said seat when the tubing is moved longitudinally, and positive means for holding the packer body against movement on the tubing and the valve unseated while the device is being lowered into the well.

16. In a device of the character described for use with oil and gas wells, the combination of a discharge tubing, a body member through which the tubing is movable longitudinally, a packer carried upon the body, means for setting the packer in the well, a valve seat upon the body surrounding the tubing, a valve carried by the tubing and engaging said seat when the tubing is moved longitudinally, and yieldable means for positively supporting the tubing above the packer and holding said valve elevated above the seat while the device is being lowered in the well.

17. A packer comprising a hollow body, an anchor tubing suspended from the body, a packing on the body, a valve member for opening and closing one end of the body, means at each end of the body movable relatively to the other; and to the body for expanding the packing, said means at one end of the body being operatively connected with said valve, and means on the valve member through which said valve member may be connected with a well tubing, the lower end of the body being open to the gas rising outside of the anchor tubing.

18. The combination with a hollow well packer, of a head having a gas escape port therein, a valve member carried by the head and movable relatively thereto for opening and closing said port, tubing extending through the packer and connected with the valve member, and positive means for holding the valve open while the packer is being set.

19. The combination with a hollow well packer, of a head having a gas escape port therein, a discharge tubing movable through the head, the head having a valve seat surrounding the tubing, a valve member carried by the tubing and located above the head for engagement with the seat thereof, and a coiled spring surrounding the discharge tubing and normally holding said valve member elevated above the seat of the head.

20. A packer comprising a hollow body, a packing on the body, a valve member for opening and closing one end of the body, means at each end of the body movable relatively to the other; and to the body for expanding the packing, said means at one end of the body being operatively connected with said valve, means on the valve member through which said valve member may be connected with a well tubing, and positive means for holding the valve member elevated and open while the packer is being lowered into a well.

21. The method of placing a flowing oil or gas well under control for utilizing and conserving the gas pressure thereof which consists, in forming a compression chamber above the fluid level by lowering into the well against said pressure, a packing device, while permitting an escape of gas pressure upward through said device after its anchor tube has been immersed in the fluid, and subsequently setting the packing device at different levels in the well to vary the volume of the compression chamber formed above the fluid level.

22. The method of placing a flowing oil or gas well under control for utilizing and conserving the gas pressure thereof which consists in forming a compression chamber above the fluid level by lowering into the well against said pressure, a packing device, while permitting an escape of gas pressure upward through said device after its anchor tube has been immersed in the fluid, anchoring said packing device to the side walls of the well to form a compression chamber therebelow, and subsequently disengaging said device and anchoring it to the side walls of the well at different levels in the well and shutting off the escape of pressure through said device to vary the volume of the compression chamber formed above the fluid level.

In testimony whereof I affix my signature.

ERD V. CROWELL.